United States Patent

[11] 3,595,111

| [72] | Inventor | Welcome D. Hershberger<br>16135 Petro Drive, Mishawaka, Ind. 46544 |
|---|---|---|
| [21] | Appl. No. | 804,556 |
| [22] | Filed | Mar. 5, 1969 |
| [45] | Patented | July 27, 1971 |

[54] METHOD AND APPARATUS FOR FORMING WORKPIECES
10 Claims, 13 Drawing Figs.

[52] U.S. Cl................................................ 83/19,
83/51, 83/175, 83/375, 83/624
[51] Int. Cl........................................... B26d 7/08
[50] Field of Search.......................... 83/19, 175,
684, 685, 624, 51, 55, 382, 456, 375

[56] References Cited
UNITED STATES PATENTS

| 1,476,706 | 12/1923 | Furber............................ | 83/51 X |
| 1,617,511 | 2/1927 | Balch............................. | 83/19 |
| 2,295,090 | 9/1942 | Knight........................... | 83/19 |
| 2,375,518 | 5/1945 | Bolle............................. | 83/19 |
| 3,217,574 | 11/1965 | Nauta et al..................... | 83/176 X |
| 3,405,437 | 10/1968 | Murray.......................... | 83/19 |

Primary Examiner—James M. Meister
Attorney—Olsen and Stephenson

ABSTRACT: Apparatus for cutting foam rubber and the like to a desired shape from a blank of foam rubber material. The apparatus includes a punch and die set which has complementary cutting edges adapted to abut against each other when the set is closed, and complementary lands on one side of each cutting edge in spaced relation when the set is closed for engaging and compressing the blank as an incident to closing the set, thereby causing controlled internal flow of the material immediately prior to the material being cut so that the cutting operation produces an article of the desired shape. A method of cutting an article to a desired shape is disclosed comprising the steps of applying pressure to a portion of a blank of resilient material so as to cause internal flow within the elastic limits of the material across the intended path of cut, and then cutting the material on said intended path of cut while maintaining the pressure on the blank.

PATENTED JUL 27 1971 3,595,111

INVENTOR
WELCOME D. HERSHBERGER

BY *Olsen and Stephenson*
ATTORNEYS

METHOD AND APPARATUS FOR FORMING WORKPIECES

The present invention relates to a method of and an apparatus for cutting a workpiece to a desired shape from a blank of resilient material.

When it is desired to cut workpieces from resilient material such as foam rubber and the like, it is the common practice to perform this operation by employing a bandsaw by which the general outline of the workpiece is cut, and thereafter, if rounds or concave peripheral surfaces, or the like, are to be formed on the workpiece, such forming operations are carried out by a grinding operation on the workpiece. Operations of this character are necessarily time consuming, and when large-volume production is required, such operations are relatively inefficient.

It is an object of the present invention to provide an improved method of manufacturing workpieces which are derived from a blank of resilient material, such as foam rubber and the like, whereby such workpieces can be produced by mass-production procedures resulting in workpieces of uniformly accurate shapes and sizes.

It is another object of the present invention to provide an improved method of the foregoing character whereby a workpiece is cut from a blank in such a manner that the desired rounds or external configurations are formed in the periphery of the workpiece as an incident to the cutting operation.

It is another object of the present invention to provide an improved method of the foregoing character in which the workpiece is cut from a blank of material by a punching operation, and wherein the periphery of the workpiece is shaped by compressing portions of the blank a controlled amount so as to cause predetermined internal flow of the resilient material in a desired direction, and thereafter cutting the resilient material across the path-of-flow of material.

It is another object of the present invention to provide apparatus for carrying out the aforesaid methods.

Other objects of this invention will appear in the following description and appended claims, reference being had to the accompanying drawings forming a part of this specification wherein like reference characters designate corresponding parts in the several views.

Before explaining the present invention in detail, it is to be understood that the invention is capable of other embodiments and of being practiced or carried out in various ways. It is also to be understood that the phraseology or terminology employed herein is for the purpose of description and not of limitation.

Figure 1:
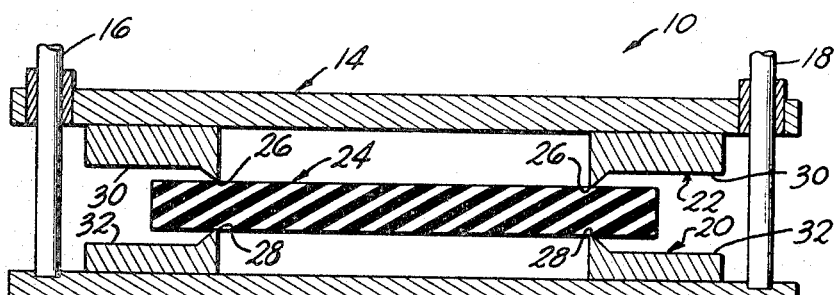
FIG. 1 is a fragmentary sectional view of a punch and dieset employed for carrying out the method comprising the present invention and showing a blank of material supported therein.

Referring now to the drawings, the present invention will be described first with respect to the steps of operation illustrated in FIGS. 1 to 5, inclusive. In FIG. 1 shown a punch-and-die set 10 having a stationary or lower dieholder 12, and a movable dieholder or punch plate 14 which is movable on the pair of guide posts 16 and 18. Secured to the stationary dieholder 12 is a lower die 20, and secured to the movable dieholder or punch plate 14 is an upper die or punch 22. The punch-and-die set 10 is adapted to be mounted in a conventional punch press, not shown, so that the punch plate 14 and its upper die or punch 22 can travel on the guide posts 16 and 18 for striking the blank of material 24 to cut therefrom a workpiece to desired dimensions and configurations. In the illustrated position of FIG. 1, the punch plate 14 and its upper die or punch 22 are shown at the instant of the downward travel when the punch 22 has initially made contact with the blank 24.

Figure 4:
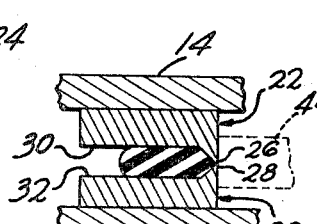
FIG. 4 is another fragmentary sectional view taken along the plane of cutting of the apparatus of FIG. 1 showing the apparatus in its closed position.
Figure 5:
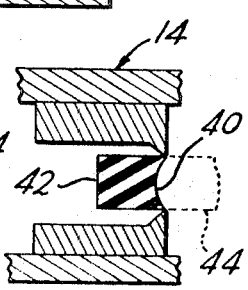
FIG. 5 is a view similar to FIG. 4 but showing the apparatus in its partially open position after having performed the cutting operation on the blank of material.

The punch 22 and the die 20 are constructed so that they have substantially the same dimensions and are interchangeable. It will be observed that the edge 26 of the punch and the edge 28 of the die are in alignment so that they will abut when the punch-and-die set 10 is in its fully closed position, as shown in FIG. 4. The punch 22 has a flat land 30 formed on the outer side of the cutting edge 26, and the die 20 has a similar and complementary land 32 formed outwardly of the cutting edge 28 so as to form compression surfaces for engaging and compressing the portion of the blank on one side of the normal path of movement of the cutting edge 26 for a purpose which will now be described.

Figure 2:
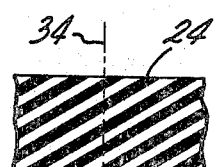
FIG. 2 is an enlarged sectional view of the material supported in the apparatus of FIG. 1, showing a broken line representing the normal plane of cutting at the left side of the apparatus in FIG. 1.
Figure 3:
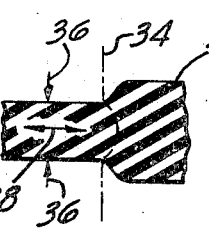
FIG. 3 is a diagrammatic illustration of the material shown in FIG. 2 illustrating the manner in which the material is initially compressed and the flow of material that occurs out of the plane of cutting as a result of such compression, all as an incident of operation of the apparatus of FIG. 1.

Referring to FIGS. 2 and 3, attention is directed to the broken line 34 to which reference is made for the purpose of explaining the internal flow which occurs in the resilient material when pressures are exerted on a portion of the material on one side of the line while allowing a portion of the material on the opposite side of the line to remain in a relatively uncompressed state or in a different state of compression. FIG. 2 illustrates a condition when no pressure is exerted on the blank of material 24, and FIG. 3 illustrates a condition when pressure is applied to the surfaces of the blank 24 on the left side of line 34, as indicated by the arrows 36. Such pressure on the opposite surfaces of the blank 24 will cause lateral internal flow of the material of the blank as indicated by the indicator arrow 38, and this in turn will cause the material along the line 34 to flow in the direction of the material on the right side of the line 34 as shown by the inward curvature of line 34. The pressures, indicated by the arrows 36, are exerted on the blank 24 when the punch-and-die set 10 is moved to the closed position shown in FIG. 4. These pressures are exerted by the lands 30 and 32. Thus, when the cutting edges 26 and 28 are in the closed position of FIG. 4, they will in effect have cut through some of the material that has been caused to flow to the uncompressed side of line 34, and thereafter, when the punch-and-die set 10 is moved to the partially open position shown in FIG. 5, the resilient material in the blank 24 will flow back to the original position prior to the cut, and this will result in the concave surface 40 on the scrap portion 42 on the left of the cut surface, and will provide a corresponding convex or rounded peripheral edge on the workpiece, shown in broken lines, which will be formed on the right side of the cutting path of the punch-and-die set 10.

In carrying out the present invention, the shape and degree of curvature in the surface at the line 40 can be determined and established by the amount of compression to which the portion of the material on one side of the line 34 is subjected, immediately prior to the cutting action of the cutting edges 26 and 28. Thus, if the lands 30 and 32 have less clearance between them at the time the cutting edges 26 and 28 come into abutting relationship, greater pressures will be exerted on the portion of the material to the left of the path of cut, and this will increase the extent of lateral internal flow of the material, which in turn will result in a greater concave cut into the scrap 42, and a greater convex surface on the finished workpiece 44.

In the arrangement shown in FIGS. 1—5, inclusive, an operation is described whereby a workpiece, derived from that portion of the material which is confined between and which is radially inwardly of the cutting edges 26 and 28, will have a round or convex surface about its periphery. It is to be understood that any degree of curvature can be obtained which is of a convex design by using lands which are located externally of the cutting edges 26 and 28 and which have proper spacing when the punch-and-die set 10 is closed. Conversely, and if desired, a workpiece can be formed in which a concave periphery is formed on that portion of the material which is confined within the cutting edges 26 and 28.

Figure 9:
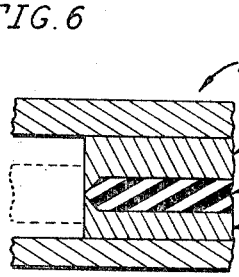
FIG. 9 is a fragmentary sectional view taken along the plane of cutting of the apparatus shown in FIG. 6, illustrating the apparatus in its closed position.
Figure 10:
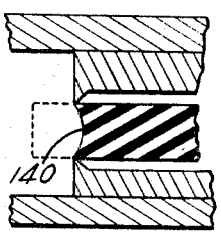
FIG. 10 is a view similar to FIG. 9, but showing the apparatus in a partially open position after having cut the blank of material.

For an arrangement which will accomplish this purpose, attention is directed to the apparatus shown in FIGS. 6 to 10, inclusive. As there shown, a punch-and-die set 110 includes an upper die or punch 122 which is constructed to have a land 130 formed internally of the cutting edge 126. A diemember 120 is similarly formed so that it has a land 132 located internally of the cutting edge 128. Thus, when pressure is exerted on portions of the surface of the material 124 as an incident to the closing of the punch and dieset 110, such pressure will cause lateral internal flow of the material in the direction of the indicator arrows 138. This will have the effect of moving the indicator line 134 to the position shown in FIG. 8, or in the opposite direction from that shown in FIG. 3. Therefore, when the punch-and-die set 110 is closed, as shown in FIG. 9, the cutting edges 126 and 128 will have cut across material flowed laterally outwardly from between the lands 130 and 132. Thereafter, when the punch-and-die set 110 is moved to a partially open position, such as is shown in FIG. 10, the cut material within the confines of cutting edges 126 and 128 will have a concave periphery 140.

Figure 6:
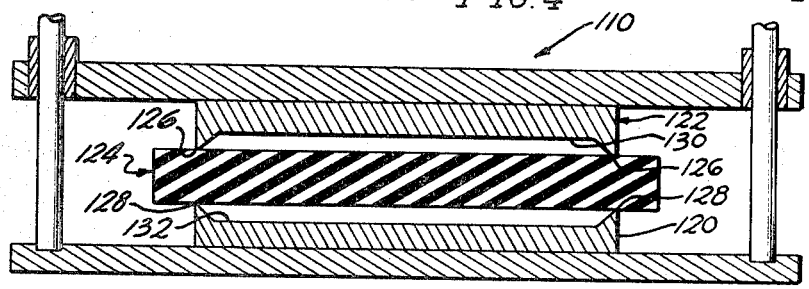
FIG. 6 is a modified form of the apparatus shown in FIG. 1.
Figure 7:
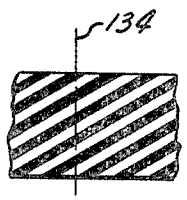
FIG. 7 is an enlarged fragmentary section of the blank of material shown in FIG. 6, illustrating by a broken line the normal plane of cutting of the apparatus.
Figure 8:
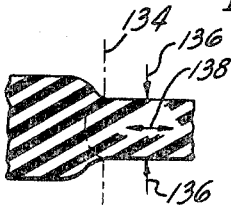
FIG. 8 is a fragmentary sectional view of the material illustrated in FIG. 7, showing diagrammatically the pressure that is applied to the blank as an incident to closing the apparatus of FIG. 6, and showing the internal flow of the material that occurs as a result of this operation.

From the foregoing descriptions of the embodiments in FIGS. 1 and 6, it can be understood that proper establishing of the pressure exerted on one or the other side of the cutting edges enables one to obtain a desired configuration of the cut edge after the resilient material has been allowed to spring back to an uncompressed state. As shown, concave or convex surfaces can be obtained, and the forming operation is not limited to circular objects, such as are shown in these embodiments, but it is also possible to cut strips or belts which can be shaped to have either concave or convex surfaces.

Figures 11, 12:
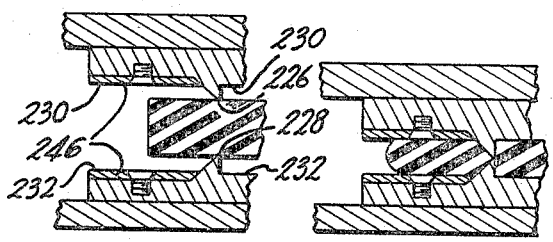
FIG. 11 is a modified form of the apparatus shown in FIGS. 1 and 6.
FIG. 12 is a fragmentary section similar to that of FIG. 11, but showing the apparatus in its closed position after having cut a blank of material.
Figure 13:
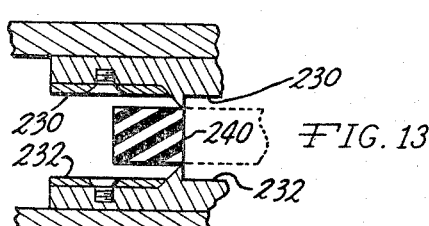
FIG. 13 is a view similar to FIG. 12, but showing the apparatus in a partially open position after having cut the blank.

It is also possible to compress both sides of the cutting edges such as is shown in the embodiments illustrated in FIGS. 11 to 13, inclusive. In so doing, the cut workpiece can have a surface which in cross section is straight as shown in FIG. 13.

Thus, in this embodiment, compressing lands 230 and 232 are located on both sides of cutting edges 226 and 228, respectively. The lands 230 and 232 are so arranged that a straight edge 240 results.

It is to be understood that certain experimentation may be required to establish the necessary amount of compression of the material on one or both sides of the cutting edges. For this purpose shims 246 may be added on one or the other side of the cutting edges.

Having thus described my invention, I claim:

1. A method of cutting a workpiece to a desired shape from a blank of resilient material comprising the steps of positioning the blank between two cutting edges which are mounted for relative movement toward one another into abutting relation, applying pressure to a portion of the blank on one side of the intended path of cut an amount relatively greater than on the other side of the intended path of cut so as to cause internal flow of resilient material of the blank transversely across the intended path of cut, and relatively moving said cutting edges toward one another into abutting engagement to cut said blank while said pressure is applied.

2. A method of cutting a workpiece according to claim 1 wherein the portion to which pressure is applied is a part of the cut workpiece.

3. A method of cutting a workpiece according to claim 1 wherein the portion to which pressure is applied is a part of the blank adjacent to the cut workpiece.

4. A method of cutting a workpiece according to claim 1 wherein pressure is applied to portions of the blank adjacent to both sides of the intended path of cut so as to effect a desired pattern of internal flow of the resilient material, and thereafter cutting said material on said intended path of cut while such pressures are applied.

5. A method of cutting a workpiece according to claim 1 wherein said blank of resilient material comprises foam rubber.

6. A method of cutting a workpiece according to claim 1 wherein the step of cutting the workpiece from a blank of resilient material is accomplished by supporting the blank in a die of a punch-and-die set, and striking the blank with the associated punch.

7. A method of cutting a workpiece according to claim 6 wherein the pressure is applied to a portion of the blank prior to cutting the same by compressing said portion between said punch and said die as an initial incident to the striking action of said punch.

8. Apparatus for cutting a workpiece to a desired shape from a blank of resilient material comprising a punch and a die set having complementary cutting edges adapted to abut against each other when the set is closed, and complementary lands on one side of each cutting edge in spaced-apart relation when said set is closed for engaging and compressing said blank as as incident to closing said set.

9. Apparatus for cutting a workpiece according to claim 8 wherein said lands are located on the side of each cutting edge remote from the which defines the periphery of the workpiece.

10. Apparatus for cutting a workpiece according to claim 8 wherein said lands are located on the side of each cutting edge which defines the periphery of the workpiece.